UNITED STATES PATENT OFFICE.

JOHN M. BATCHELDER, OF CAMBRIDGE, MASSACHUSETTS.

IMPROVEMENT IN COMPOUNDS FOR INSULATING TELEGRAPH-WIRES.

Specification forming part of Letters Patent No. 27,770, dated April 10, 1860.

*To all whom it may concern:*

Be it known that I, JOHN M. BATCHELDER, of Cambridge, in the county of Middlesex and State of Massachusetts, have invented an Improvement in Insulation of Submarine Telegraph-Wires; and I do hereby declare that the following is a full and exact description of the mode of making and using the same.

It is well known that the material commonly used for the insulation of submarine telegraph-wires is gutta-percha, the qualities of which are in many respects very suitable, but in others is not well adapted to purposes of insulation. For instance, it is so much softened at a temperature as low as 120° Fahrenheit that when laid in coils the central conducting-wire is displaced and often comes near the exterior of the coating. This may occur when exposed in summer to the direct rays of the sun, or when stowed in the heated hold of a steamship. It is also important that the insulating part of a telegraph-cable should be of greater diameter than it has usually been made, thus increasing the conducting capacity of the wire. A cheaper material, and one in which the specific gravity can, within certain limits, be regulated is therefore desirable.

My insulating material is composed of silex in fine powder, sulphur, and india-rubber, the proportion of each being so varied as to change the elasticity and the specific gravity as required. It is prepared by thoroughly grinding or masticating about twenty parts of india-rubber and five parts of sulphur, thus forming a paste or dough according to the ordinary process of making vulcanized india-rubber, as set forth in Letters Patent granted to Charles Goodyear and others. I then mix with this compound seventy-five parts of pure silex in fine powder, incorporating the whole so that the rubber, sulphur, and silex are uniformly mixed throughout the whole mass.

I prefer to make the powdered silex by grinding pure quartz in a mill in the manner commonly practiced by manufacturers of porcelain. Glass or other good non-conductors of electricity may, however be used for this purpose.

The compound, being prepared as above stated, is in readiness for the vulcanizing process, which is conducted in the ordinary manner, the degree of heat being such as to allow the resulting substance to be sufficiently flexible when applied to the conductor of a telegraph-cable.

Using the proportions above given of rubber, sulphur, and silex, the specific gravity is about 1.600. It will not soften at a lower temperature than 270° Fahrenheit, and is much more flexible than gutta-percha.

The above completes the description of my new insulating substance, which, being composed of a large proportion of glass or silicious materials, is a better electric than the gutta-percha of the quality commonly used in the manufacture of telegraph-cables.

This compound is to be applied to the conducting-wire either by drawing or forcing it through suitable apertures, by winding the wire with spiral fillets, by passing it through grooved rollers, or in any other convenient manner.

I do not specify any particular mode of manufacturing a telegraph-cable, as my invention relates solely to the insulating compound or material produced substantially as herein described.

I am aware that Letters Patent have been granted for the admixture of various earths and fibrous or other materials with the compound of india-rubber and sulphur, by which processes articles are produced that are adapted to especial purposes, and I hereby disclaim all such mixtures or compounds, confining my improvement strictly to the mixture of an absolute non-conductor of electricity with the rubber and sulphur, whereby a high electric or non-conducting substance is produced, while it is at the same time well adapted in other respects for the insulation of conducting-wires of electric telegraphs.

What I claim, and desire to secure by Letters Patent, is—

A telegraph-wire or other conductor of electricity insulated with a compound substance composed of pulverized silex, glass, or other non-conducting material, mixed with india-rubber and sulphur, and subsequently vulcanized, substantially as herein described.

J. M. BATCHELDER.

In presence of—
FRANKLIN HUNT,
SAML. BATCHELDER, Jr.